356-400

OR 3,867,038

United States Patent
Westell

[11] 3,867,038
[45] Feb. 18, 1975

[54] OPTICAL ALIGNMENT SYSTEM
[75] Inventor: William Westell, Weston, Mass.
[73] Assignee: Baird-Atomic, Inc., Bedford, Mass.
[22] Filed: Aug. 29, 1973
[21] Appl. No.: 392,804

Related U.S. Application Data
[63] Continuation-in-part of Ser. No. 309,625, Nov. 27, 1972.

[52] U.S. Cl............... 356/172, 356/169, 250/237 G
[51] Int. Cl. .......................................... G01b 11/26
[58] Field of Search......... 356/172, 169; 250/237 R, 250/237 G

[56] References Cited
UNITED STATES PATENTS
| | | | |
|---|---|---|---|
| 3,508,834 | 4/1970 | Hock et al. | 356/169 X |
| 3,588,462 | 6/1971 | Kreckel | 356/169 X |
| 3,712,740 | 1/1973 | Hennings | 356/169 X |
| 3,755,682 | 8/1973 | Russell | 250/237 G X |

Primary Examiner—Ronald J. Stern
Assistant Examiner—Paul K. Godwin
Attorney, Agent, or Firm—Morse, Altman, Oates & Bello

[57] ABSTRACT

A pair of relatively movable objects are aligned to each other in a predetermined relationship by matching images of fixed reticles on the objects to a rotating reticle by convolution of the fixed reticle images with the rotating reticle and generating analog image displacement signals representing the relative positions of the objects for closed loop control of the relative positions of the objects. The energy generated by the convolution of the objects is transduced by radiometric detectors to electrical signals having characteristic frequencies defining the relative positions of the objects. The characteristic frequencies are generated by a frequency phase lock control which provides interrogation of the objects by the reticle scan, the rotating reticle operating as a relative spatial reference which is phase-locked to a fixed frequency generated by a stable oscillator. Doppler frequencies corresponding to image velocities are digitally detected by doppler comparators and converted to doppler phase shift signals corresponding to the relative displacements of the objects. The digital doppler phase shift signals and digital signals corresponding to a desired offset between the objects are accumulated in a tracking register. The accumulated digital signals are converted to analog signals for closed loop control of the relative positions of the objects with respect to each other.

13 Claims, 5 Drawing Figures 3,867,038

OPTICAL ALIGNMENT SYSTEM

CROSS REFERENCE TO RELATED APPLICATIONS

The present application is a continuation-in-part of Ser. No. 309,625, for a Passive Image Stabilization System, filed Nov. 27, 1972 in the name of the inventor hereof and assigned to the assignee hereof.

BACKGROUND OF THE INVENTION

1. Field of Invention

The present invention relates to measurement systems and, more particularly is directed towards electro-optical measurement systems such as alignment systems, verniers and encoders.

2. Description of the Prior Art

Optical resolution achievable with optical encoding and spectrometer systems has been limited by optical-diffraction relations in both the fabrication and readout of reference reticle patterns. In coarse gratings, resolution is limited by grating spacing and in fine gratings, resolution is restricted by diffraction limitation.

SUMMARY OF THE INVENTION

It is an object of the present invention to provide an optical measurement system which does not suffer from the heretofore mentioned disadvantages. The present invention comprises a sensor having a rotating reticle operating as a relative spatial reference which is phase-locked to a stable oscillator fixed frequency for generating radiometric signals having characteristic frequencies defining the relative displacements between two objects, the images of fixed reticles on the two objects being matched to the reticle in an image plane. The energy due to the convolution of the fixed reticle images is transduced by radiometric detectors to electrical signals having characteristic frequencies precisely generated by a frequency phase lock control which provides an interrogation of object positions by the reticle scan. Doppler frequencies corresponding to image velocities are digitally detected by doppler comparators. Doppler phase shift signals corresponding to relative displacement of the objects and digital signals defining a desired offset between the objects are accumulated in a tracking register. Digital signals corresponding to the relative displacements between the objects are read out of the tracking register by a digital to analog converter which converts the digital signals to analog signals for closed-loop control of the desired alignment between the objects.

The invention accordingly comprises the system possessing the construction, combination of elements, and arrangements of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE INVENTION

Figure 1:
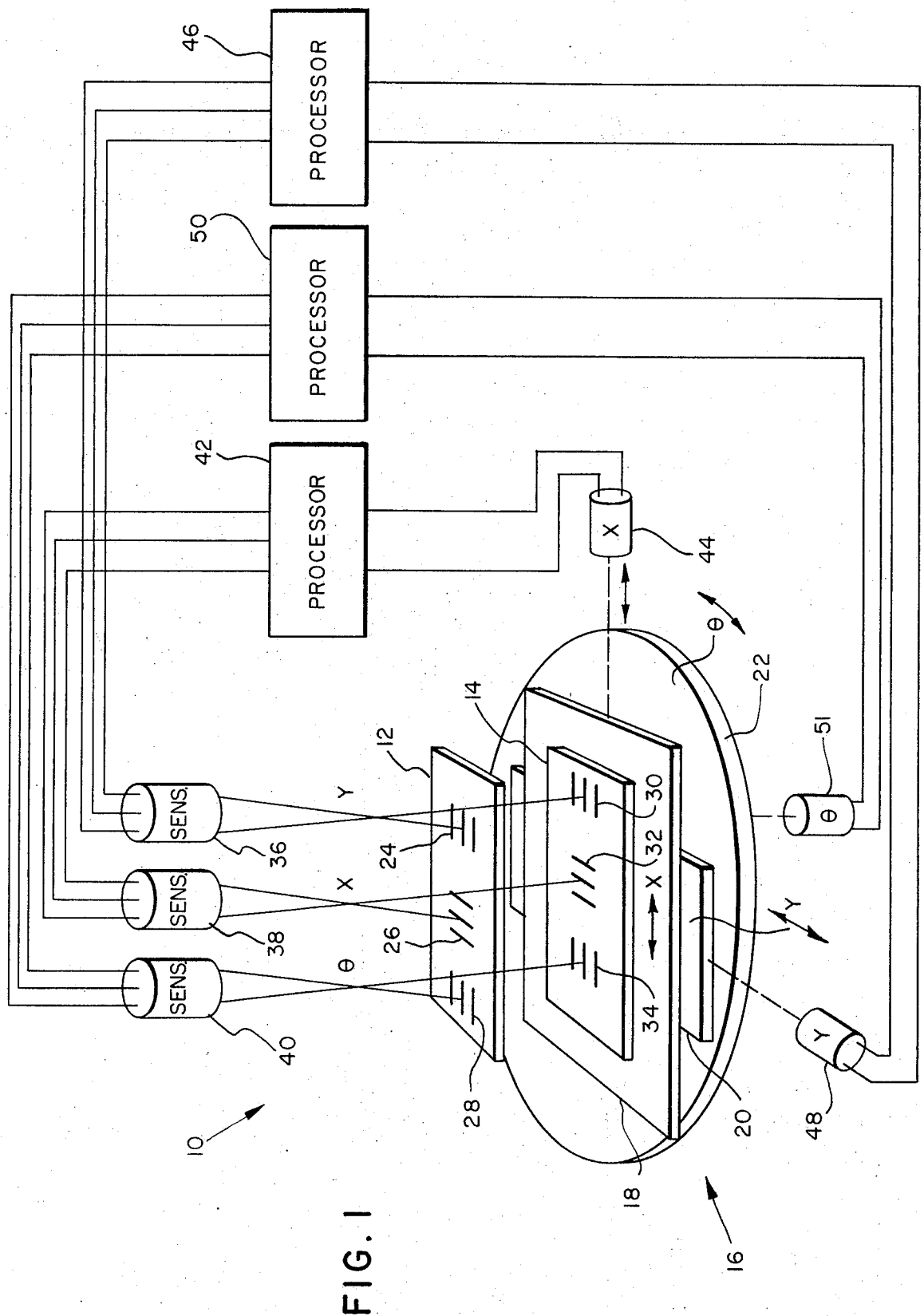
FIG. 1 is a block diagram of a three axis optical alignment system embodying the present invention.

Referring now to the drawings, particularly FIG. 1, there is shown, by way of example, a three axis optical alignment system 10 for predetermined orientation of objects 12 and 14 with respect to each other. Objects 14 is mounted on an XY$\theta$ table 16 comprising a platform 18 adapted for transverse movement in an X direction, a platform 20 adapted for transverse movement in a Y direction, and a platform 22 adapted for rotational movement in a $\theta$ direction. Object 12 is provided with fixed reticles 24, 26 and 28, and object 14 is provided with fixed reticles 30, 32, and 34. Fixed reticles 24 and 30 define a first reticle pair fixed reticles 26 and 32 define a second reticle pair, and fixed reticles 28 and 34 define a third reticle pair. The first and third reticle pairs include equally spaced bars disposed in spaced parallel relationship to the X axis and the second reticle pair includes equally spaced bars disposed in spaced parallel relationship to the Y axis. As hereinafter described, the first reticle pair provides transverse displacement data relative to the Y axis alignment of objects 12 and 14; the second reticle pair provides transverse dislacement data relative to the X axis alignment of objects 12 and 14; and the third reticle pair provides rotational displacement data relative to the $\theta$ alignment of objects 12 and 14.

The Y axis displacement data, the X axis displacement data and the $\theta$ displacement data are detected by sensors 36, 38 and 40, respectively. Sensor 36 is connected to a processor 42 which generates command signals for controlling a motor 44 operatively connected to platform 20, sensor 38 is connected to a processor 46 which generates command signals for controlling a motor 48 operatively connected to platform 18, and sensor 40 is connected to a processor 50 which generates command signals for controlling a motor 51 operatively connected to platform 22. As hereinafter described in connection with FIG. 2, it will be seen that the reticle pairs are matched to a rotating reticle in the associated sensor by convolution of the fixed reticle images with the rotating reticle. The energy generated by the convolution of fixed reticle images is transduced by radiometric detectors into electrical signals having characteristic frequencies defining the relative displacement between objects 12 and 14, the rotating reticle operating as a relative spatial reference which is phase-locked to a stable oscillator fixed frequency. Processors 42, 46 aand 50 process the electrical signals and generate command signals for positioning platforms 20, 18 and 22, respectively.

Figure 2:
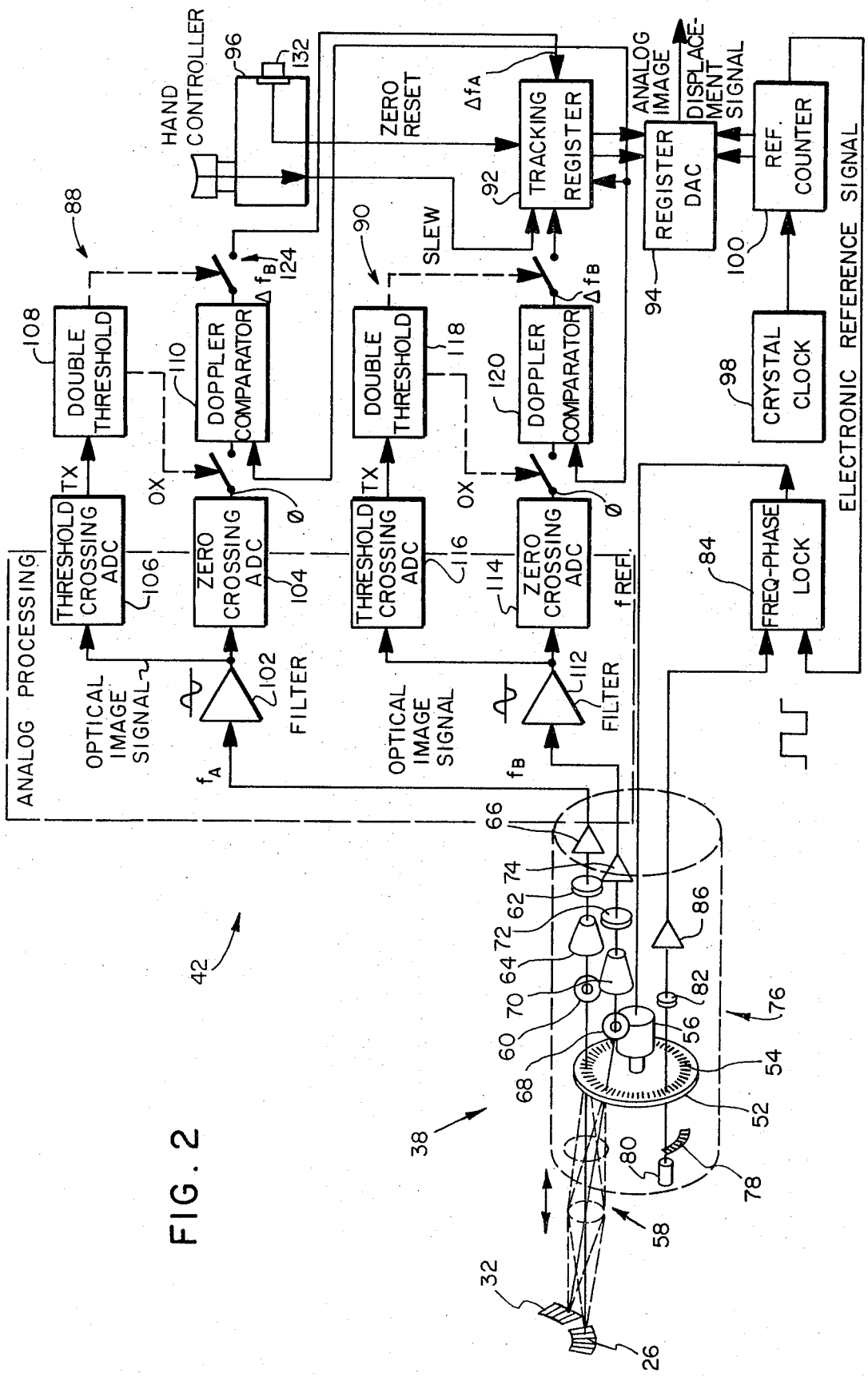
FIG. 2 is a block and schematic diagram of one axis of the three axis optical registration system of FIG. 1.

Referring now to FIG. 2, there is shown a detailed block and schematic diagram of the X axis electro-optical assembly comprising sensor 38 and processor 42. Sensor 38 includes a rotating reticle 52, for example a sun burst pattern with radial bars 54, which is driven by a motor 56. The images of reticles 26 and 32 are matched to rotating reticle 52 in the image plane formed by objective lenses 58. The light flux of which the image of reticle 26 is constituted is chopped by rotating reticle 52, transmitted through an apodization filter 60, and optically coupled to a photodetector 62 via a light conduit 64. Reticle 26 image signal is detected by photodetector 62, for example a photodiode, and fed to processor 46 via a DC preamplifier 66, reticle 26 signal applied to processor 46 denoted $f_A$. The light flux of which the image of reticle 32 is constituted, is chopped by rotating reticle 52 transmitted through an apodization filter 68 and optically coupled to a photodetector 70 via a light conduit 72. Reticle 32 image signal is detected by photodetector 70, for example a photodiode, and fed to processor 46 via a DC preamplifier 74, reticle 32 signal applied to processor 46 denoted $f_B$.

In the preferred embodiment, each apodization filter 60 and 68 is a sharp-cutoff, low-pass spatial filter which has a very low modulation transfer function (MFT) at the reticle spatial frequency (inverse of one reticle cycle). Apodization filters 60 and 68 reduce the field-of-view (FOV) modulation produced by rotating reticle 52 by chopping the edges of the field-of-view to below the photon noise level and leaving the field of view, the optical most significant bit (MSB) at the half-power points. In the illustrated embodiment, the field of view is encoded into five optical bits, one reticle cycle is one optical least significant bit (LSB), 32 reticle cycles between the field of view half-power points. The function of each apodization filter in space is a cumulative Gaussian with standard deviation equal to one reticle cycle (LSB). Thus, the MTF is the product of the Gaussian transform and sin $x/x$ due to MSB transform (retangular FOV function).

An optical reference signal for control of motor 56, for example an AC torque motor, is generated by a reference unit 76 in sensor 38. Reference unit 76 is ideally located coincident with the image field of view defined by apodization filters 60 and 68, but is shown separated in FIG. 2 for purposes of clarity. The image beams and the reference radiation beam are separated by off-axis imaging techniques. In reference unit 76, a reference reticle 78 illuminated by an optical reference lamp 80 is convolved with moving reticle 52. The resultant optical reference signal is detected by a photodetector 82 and applied to a frequency and phase-lock servo 84 via a preamplifier and zero-crossing analog to digital converter 86. The signal fed to phase-lock servo 84 is the optical reference signal. The optical reference is precisely synchronized in time and space to rotating reticle 52 in such a manner that the reticle cycle has a 10 bit electrical resolution and the field of view is spatially digitized simultaneously into five optical bits and 15 electrical bits. The frequency and phase-lock servo processing utilizes digital signal processing similar to the image signal processing hereinafter described.

As best shown in FIG. 2, processor 42 comprises phase-lock servo 84, analog processing sections 88 and 90, a tracking register 92, a register digital to analog converter 94, a handle controller 96, a clock 98, and a reference counter 100. Analog processing section 88 includes a filter 102, a zero crossing analog to digital converter 104, a threshold crossing analog to digital converter 106, a double threshold decision logic 108 and a doppler comparator 110. Analog processing section 90 includes a filter 112, a zero crossing analog to digital converter 114, a threshold crossing analog to digital converter 116, a double threshold decision logic 118 and a doppler comparator 120.

The optical image signal $f_A$ as the output of DC preamplifier 66 is applied to zero crossing analog to digital converter 104 and threshold crossing analog to digital converter 106 via filter 102, for example a 800 ± 400 Hz band pass filter, which operates to maximize image signal to combined photon and dark noise. Zero crossing analog to digital converter 104 and threshold crossing analog to digital converter 106 are analog comparators with binary outputs having excellent time resolution at the null crossing. Analog to digital converters 104 and 106 have a ± ½ sigma noise-level hysteresis to avoid false triggering at low signal amplitudes. It is preferred that the input and output leads of analog to digital converters 104 and 106 are well guarded to avoid electrical pickup, for example 800 and 400 Hz electrical reference which increases with lower-signal-to-noise ratio and results in a position offset. Zero crossing analog to digital converter 104 maximizes the image doppler correlation, Signal-to-Noise Ratio limited by combined noise, by optimized correlation measurements at the image-signal zero crossing times when the rate of change is maximized with respect to noise. Threshold crossing analog to digital converter 106 provides a digital AM-threshold FM cross-correlation optimum estimation process which eliminates dropouts due to image fluctuation. The signal at an output terminal of threshold crossing analog to digital converter 106 is applied to double-threshold decision logic 108 and a digital phase signal $\phi$ at an output terminal of zero crossing analog to digital converter 104 is applied to doppler comparator 110 via a logic gate switching device 122. A frequency difference signal $\Delta f_A$ at an output terminal of doppler comparator 110 is fed to tracking register 92, for example an up-down counter tracking register, via a switching device 124. Switching devices 122 and 124 are controlled by double threshold decision logic 108 in such a manner that a specified threshold must be exceeded before each zero crossing or a period measurement is not entered into tracking register 92. In consequence of a threshold level to combined noise ratio of 7, nulls are anticipated before they occur. Double threshold decision logic 108 provides an optimum FM statistical estimation of the joint probability of the tracking accuracy of each millisecond sample, anticipates rapid image perturbations (range rate, aspect ratio changes, etc.) before the associated tracking errors are entered into tracking register 92. That is, double threshold decision logic 108 acts as an electronic clutch and disengages tracking register 92 from the scene during violent image distortions which are indicated by associated amplitude fluctions of the AM image signal. Doppler comparator 110 is a digital doppler detector which measures millisecond image displacements with an FM detection precision limited only by photon noise. The measurement by doppler comparator 110 is a digital autocorrelation process which makes an optimum statistical estimate of image displacement and provides the highest accuracy theoretically possible within a given measurement time.

The optical image signal $f_B$ as at the output of DC preamplifier 74 is applied to zero crossing analog to digital converter 114 and threshold crossing analog to digital connverter 116 via filter 112, for example a 800 ± 400 Hz band pass filter, which operates to maximize image signal to combined photon and dark noise. Zero crossing analog to digital converter 114 and threshold crossing analog to digital converter 116 are analog comparators with binary outputs having excellent time resolution at the null crossing. Analog to digital converters 114 and 116 have a ± ½ sigma noise-level hysteresis to avoid false triggering at low signal amplitude. It is preferred that the input and digital output leads of analog to digital converters 114 and 116 are well guarded to avoid electrical pickup, for example 800 and 400 Hz electrical reference pickup which increases with lower-signal-to-noise ratio and produces a position offset. Zero crossing analog to digital converter 114 maximizes the image doppler correlation, Signal-to-Noise Ratio limited by combined noise, by optimized correlation measurements at the image-signal zero crossing times when the rate of change is maximized with respect to noise. Threshold crossing analog to digital converter 116 provides a digital AM-threshold FM cross-correlation optimum estimation process which eliminates dropouts due to image fluctuation. The signal at an output terminal of threshold crossing analog to digital converter 116 is applied to double threshold decision logic 118 and a digital phase signal $\phi$ at an output terminal of zero crossing analog to digital converter 114 is applied to doppler comparator 120 via a logic gate switching device 126. A frequency difference signal $\Delta f_B$ at an output terminal of doppler comparator 120 is fed to tracking register 92, for example an up-down counter tracking register, via a switching device 128. Switching devices 126 and 128 are controlled by double threshold decision logic 118 in such a manner that a specified threshold must be exceeded before each zero crossing or a period measurement is not entered into tracking register 92. In consequence of a threshold level to combined noise ratio of 7, nulls are anticipated before they occur. Double threshold decision logic 118 provides an optimum FM statistical estimation of the joint probability of the tracking accuracy of each millisecond sample, anticipates rapid image perturbations (range rate, aspect ratio changes, etc.) before the associated tracking errors are entered into tracking register 92. That is, double threshold decision logic 118 acts as an electronic clutch which momentarily disengages register 92 from the scene during violent image distortions which are indicated by associated amplitude flucions of the AM image signal. Doppler comparator 120 is a digital doppler frequency detector which measures millisecond image displacements with an FM detection precision limited only by photon noise. The measurement by doppler comparator 120 is a digital auto-correlation process which makes an optimum statistical estimate of image displacement and provides the highest accuracy theoretically possible within a given measurement time.

As hereinafter described in connection with FIGS. 3, 4A and 4B, clock 84, for example a crystal clock, generates a digital reference frequency which is applied to doppler comparators 110 and 120, tracking register 92 and reference counter 100. In the illustrated embodiment, doppler comparator 110 is similar to doppler comparator 120 in structure and function and double threshold decision logic 108 is similar to double threshold decision logic 118 in structure and operation. Accordingly, for clarity, only doppler comparator 110 and double threshold decision logic 108 are presented in FIG. 3.

Figure 3:
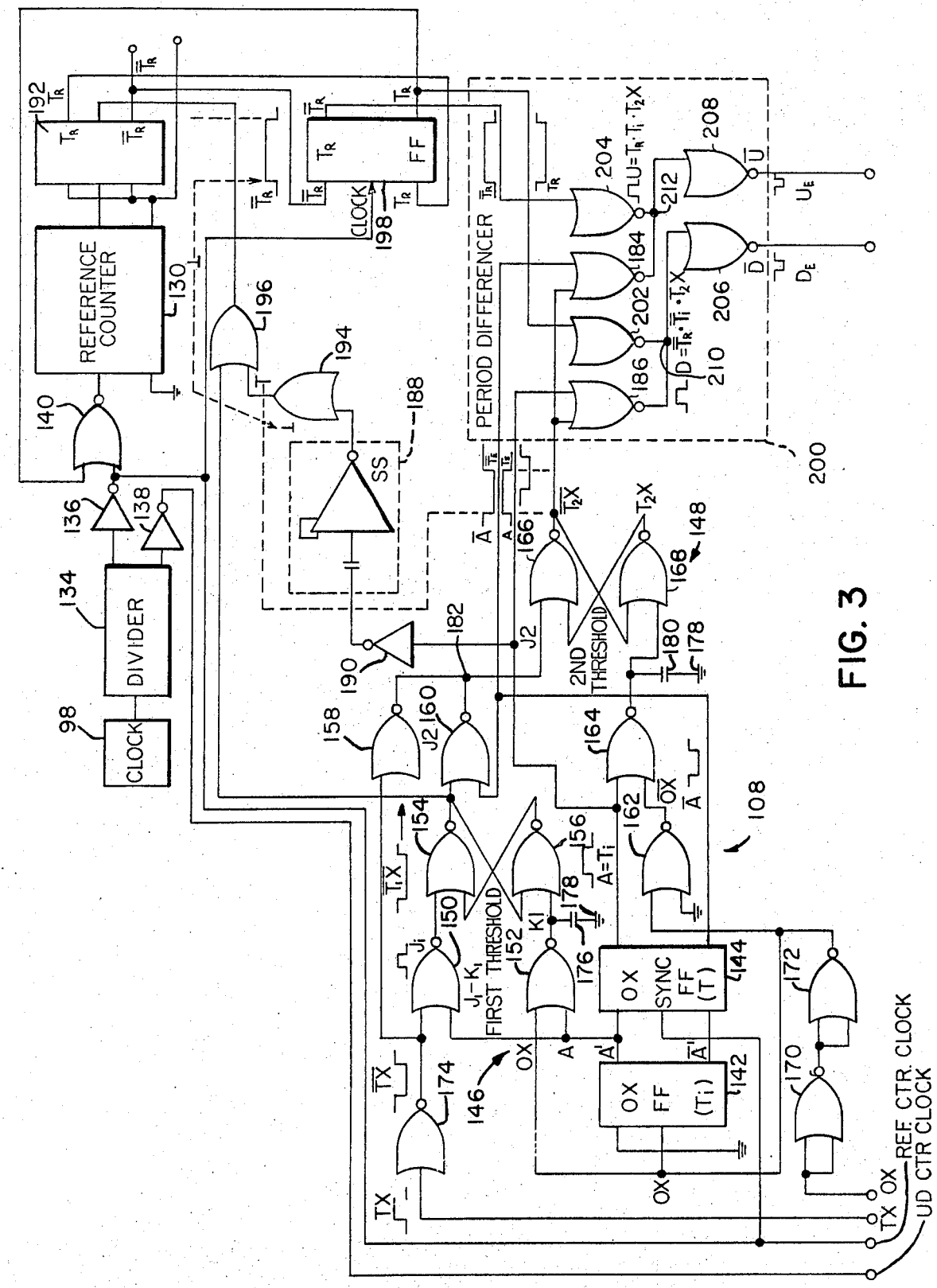
FIG. 3 is a detailed schematic diagram of the double-threshold decision logic and comparator of FIG. 2.
Figure 4A:
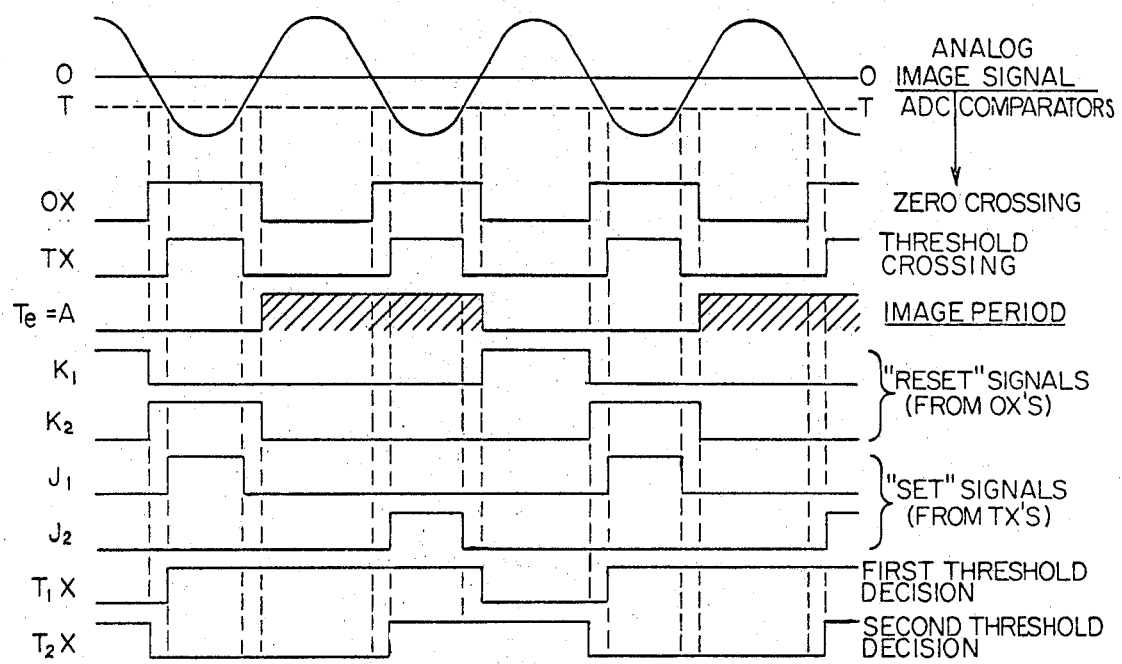
FIGS. 4A and 4B are logic timing diagrams for FIG. 3.
Figure 4B:
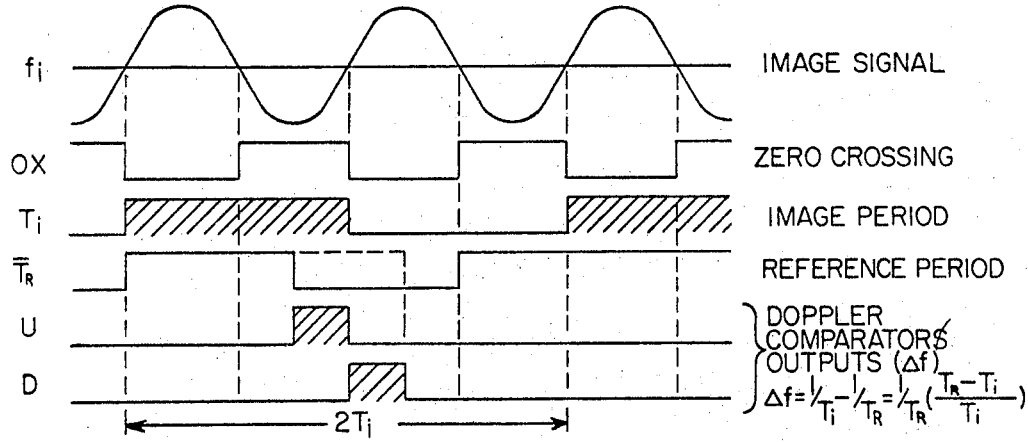

Referring now to FIG. 3, there is shown logic diagrams of doppler comparator 110 and double threshold decision logic 108. Logic operation begins with a reference counter 130 in doppler comparator 110. Countdown is initiated by the first zero crossing if the threshold is exceeded during the half-cycle immediately prior. The period (time) difference between scene and reference periods is taken with clock-synchronized logic and, if the threshold is exceeded in the half cycle prior to the second zero crossing, gates up or down clock pulses into tracking register 92 which sums bipolar slew rate generated by hand controller 96 and stops rollover counts from entering tracking register 92. Hand controller 96 includes an offset device 132 for entering predetermined digital signals representing desired offset displacements between objects 12 and 14.

Tracking register 92 accumulates image displacements in terms of up and down counts from doppler comparator 110. The count represents time differences which, averaged over the measurement cycle, represents displacement differences. In the illustrated embodiment, tracking register 92 is a digital up-down counter which stores a continuously updated best estimate of image displacements and holds that estimate during momentary interruptions of radiometric inputs and momentary image perturbations. Tracking register 92 provides image tracking displacement information suitable for control of platform 18. By way of example, tracking register 92 is a 15 bit synchronous up-down counter, the 15th bit being a polarity bit. The 10 most significant bits of tracking register 92 are converted to analog signals in a digital to analog converter 94 which generates analog signals for control of motor 48 and hence the position of object 14 on platform 18.

Crystal clock 98 generates a clock signal frequency of 3.27680 MHz, for example, which is divided in a divider 134 and fed to buffers 136 and 138. The divided clock signal, 0.8192 MHz for example, at an output terminal of buffer 136 is applied to one terminal of a two terminal NOR gate 140 and double threshold decision logic 108.

Double threshold decision logic 108 comprises an unsynchronized zero crossing flip-flop 142, a synchronized zero crossing flip-flop 144, a first threshold circuit 146 and a second threshold circuit 148. First threshold circuit 146 includes NOR gates 150, 152, 154 and 156, NOR gates 154 and 156 connected in a latch configuration. Second threshold circuit 148 includes NOR gates 158, 160, 162, 164, 166 and 168, NOR gates 166 and 168 connected in a latch configuration. The zero crossing signal OX at the output terminal of zero crossing analog to digital converter 104 is applied to zero crossing flip-flop 142, NOR gate 152 and NOR gate 162 via via serially connected NOR gates 170 and 172. The threshold signal TX at the output terminal of threshold crossing analog to digital converter 106 is applied to NOR gate 150 via a NOR gate 174. The clock signal generated by buffer 136 is applied to zero crossing flip-flop 144 for image period clock synchronization. The signal at the one terminal of zero crossing flip-flop 142 is applied to NOR gates 150, 152 and zero crossing flip-flop 144. In addition, NOR gate 150 receives the complement threshold signal $\overline{TX}$ at the output of NOR gate 174 and NOR gate 152 receives the OX signal at the output of NOR gate 172. The signal at the zero terminal of zero crossing flip-flop 142 is applied to zero crossing flip-flop 144. A signal J1 at the output terminal of NOR gate 140, a set signal derived from the threshold $\overline{TX}$, is applied to NOR gate 154 and a signal K1 at the output terminal of NOR gate 150, a reset signal derived from the zero crossing signal OX, is applied to NOR gate 156. A noise-isolation capacitor 176 is connected between the output terminal of NOR gate 152 and a return 178. The complement of a first threshold decision signal $\overline{T_1X}$ at an output terminal of NOR gate 154 is applied to NOR gate 160 and the complement threshold signal $\overline{TX}$ is applied to NOR gate 158. Also applied to NOR gate 160 is the signal at the zero terminal of zero crossing flip-flop 144. The image period signal $T_i$ at the one terminal of zero crossing flip-flop 144 is applied to one terminal of NOR gate 164 and the zero crossing signal OX is applied to another terminal of NOR gate 164 as a complement zero crossing signal $\overline{OX}$ via NOR gate 162. A reset signal $K_2$, derived from the output terminal of NOR gate 164, is applied to NOR gate 168. A noise-isolation capacitor 180 is connected between the output terminal of NOR gate 164 and return 178. The signals at the output terminals of NOR gates 158 and 160 are connected at a junction 182 and applied as a set signal $J_2$ to NOR gate 166. The complement of a second threshold decision $\overline{T_2X}$ is applied to NOR gates 184 and 186 of doppler comparator 110 for a function and logic operation. The image period signal $T_i$ and its complement $\overline{T_i}$ are also applied to NOR gates 184 and 186 of doppler comparator 110.

The clock-synchronized image period signal $T_i$ is applied further to a single shot 188 via an inverter 190. A pulse signal at the output of single shot 188 presets a flip-flop 192, for example a JK flip-flop, via serially connected NOR gates 194, 196 is the first threshold decision 146 occurs during the half-cycle immediately prior to the first zero crossing. A reference period signal TR and its complement $\overline{TR}$ generated at the one terminal of flip-flop 192 is applied to a flip-flop 198 which is clocked by the clock pulse and operates as a reference period clock synchronizer. When flip-flops 192 and 198 are reset by the first zero crossing pulse from single shot 188 passing through NOR gate 196, TR at the O terminal of flip-flop 198 goes low and clock pulses from buffer 136 pass through NOR gate 140 and start the reference period count-down by reference counter 130, for example a 10 bit ripple through binary counter. When reference counter 130 completes reference period TR countdown, logic signals at the output terminals of counter 130 complement flip-flops 192 and 194. In consequence, TR becomes high and the passage of clock pulses through NOR gate 140 terminates, thus generating a digital reference period TR which is a precise submultiple of the clock frequency. The reference period signal $T_R$ and its complement $\overline{T_R}$ are applied to a period differencer 200 which performs the digital doppler measurement in terms of period differences. These period differences have a duty-cycle exactly proportional to the frequency differences ($\Delta f = 1/T_i - 1/T_R = 1/T_R [(T_R - T_i)/T_i]$). As shown in FIG. 4B, the foregoing relationship also applied to large frequency differences since period measurements are made at a rate determined by the input frequency $T_i - 1$.

Period differencer 176 comprises NOR gates 186, 202, 184, 204, 206 and 208. The second threshold decision complement signal $\overline{T_2X}$, which goes low if the threshold crossing occurs before the second zero crossing as well as the first zero crossing, is applied to one input terminal of NOR gates 186, 184, for example two input terminal NOR gates. The image period signal $T_i$ and its complement $\overline{T_i}$ are applied to the other input terminals of NOR gates 186, 184, respectively. The reference period signal $T_R$ and its complement $\overline{T_R}$ are applied to NOR gates 202 and 204, respectively. The signals at the output terminals of NOR gates 186 and 202 are connected at a junction 210 and define a down count signal D which is the logic function: $\overline{T_r} \cdot \overline{T_i} \cdot T_2X$. The signals at the output terminals of NOR gates 184 and 204 are combined at a junction 212 and define an up count signal U which is the logic function $T_R \cdot T_i \cdot T_2X$. The up and down count signals are applied to up-down counter tracking register 92 of FIG. 2 via NOR gates 208 and 206, respectively. Tracking register 92 counts clock pulses, up or down, during the period differences U and D, respectively, thus accumulating digital image displacements in units of the reference reticle bars angular substense $\theta s$. Tracking register 92 stores displacement changes as a digital binary number for example coded as a 15 bit (14 bit plus polarity) offset binary number. Register digital to analog converter 94 in FIG. 2 converts this number to a bipolar analog voltage suitable for controlling platform 18 in FIG. 1. The timing relationships among the signals heretofore are shown in FIGS. 4A and 4B.

From the foregoing, it will be realized that the first threshold decision occurs before the image period and permits the reference count down to begin and the second decision to occur. The second threshold decision occurs if both thresholds occur before the start and end of the image period. Doppler comparator 110 passes period errors, up or down counts, only if the second threshold decision occurs. The second threshold decision occurs only if the threshold crossings occur just before both the beginning and end of the image period.

In an alternate embodiment, digital differential comparator image frequency periods and reference frequency periods are compared using analog to digital dual slope integration techniques, whereby reference counter 130 is replaced by analog integration for reference period generating synchronized to image frequency.

In an alternate embodiment of digital up down counter tracking register 92, the time difference integrations of period differences are performed by an analog integrator into which bipolar currents are gated by period differences for integration by a capacitor, whereby the capacitor voltage represents time integral of period differences. Also threshold logic 108 performs an additional gating of the bipolar currents to provide switching functions 122 and 124.

In a second alternate embodiment of digital up-down counter tracking register 92, the time-difference integrations of clock pulses occuring during the period-difference intervals are performed by two ripple counters which are initially set by the image-signal zero-crossing waveforms from zero-crossing flip-flop 142. The simpler unsynchronous ripple counters replace the more complex synchronous up-down counters and associated gating by either of two clocking techniques, both of which are made feasible by virtue of the fact that time intervals are being integrated by counting the number of clock pulses which occur during these intervals.

The first clocking technique consists of continuously clocking both ripple counters with the same clock and interrupting the clocking signal to one or the other counter during the time interval being integrated, thereby causing one counter to count up or down with respect to the count in the other counter. In particular, the integrated time intervals are given by the count in the tracking register counter during the momentary interval in which the reference counter count is zero. The tracking register digital count is read out with a digital to analog converter technique, whereby bipolar currents are gated into a capacitor during the intervals between the zero-count occurrence in counter, with the current polarity determined by the relative time sequence of zero counts in the counters. The resultant capacitor voltage is transferred to a sample and hold circuit for continuous ripple free readout.

The second clocking technique is similar with the exception that only one counter clocking signal is gated, for example, the tracking register counter; thereby providing a constant frequency division by the other counter, for example the reference counter. With this technique, either zero clock frequency as in the first technique or twice the standard clock frequency is gated into the tracking-register counter during the time intervals to be integrated, thus causing the gated clock frequency difference to be equal to the clock frequency as in the first technique. For example, up-counting is effected by gating twice the standard clock frequency, which is provided by an auxiliary single stage counter for dividing the alternate clock frequency by two in order to generate the standard clocking frequency for both counters. The digital to analog converter technique described above in connection with the first clocking technique is also suited for use with the second clocking technique.

An actual scene can be analytically visualized as the superposition of a large number of point sources, each producing a phasor, These phasors add randomly to produce a resultant phasor. The reticle within the FOV is a band-pass spatial filter. Thus the associated radiometric waveform is a narrow band signal with a Rayleigh distribution of the peaks. The frequency of this resultant digitally encoded signal is digitally compared to the reference frequency by the doppler comparator 110. The doppler resultant is digitally weighted by the measurement accuracy optimally estimated by double threshold decision logic 108 from the instantaneous signal-to-noise. Thus the doppler rate is optimally averaged by the doppler comparator 110 which operates as a digital differential analyzer according to the angular information content. Up-down counter tracking register 92 integrates doppler frequency differences $\Delta f$. Tracking register 92 accumulates image displacement changes in units of spatial reference reticle substense $\theta$s ÷ 1,024 with 10 bit reference counter 130. Register 92 integrates doppler frequency differences which are measured in clock pulses encoded in units of 1,024 × reference frequency $f_{REF}$ at the output terminal of preamplifier and zero-crossing analog to digital converter 86. The digital number in tracking register 92, for example an offset binary coded number representing displacement changes, is converted to a bipolar analog voltage by digital to analog converter 94. The signal generated by digital to analog converter 94 is a position change signal which operates to control platform 18 stabilization by closed loop nulling of the position change signal from converter 94.

In summary, the images of objects 12 and 14 are matched to the reticle 52 in the image plane formed by objective lenses 58. The energy due to the convolution of objects 12 and 14 is transduced by radiometric detectors 62 and 72 into electrical signals which have signal frequencies $f_A$ and $f_B$. These frequencies are precisely generated by the frequency-phase lock control 84, which provides an interrogation of target positions by the reticle scan. Doppler frequencies corresponding to image velocities are digitally detected by doppler comparators 110 and 120. Doppler phase shifts corresponding to relative target displacements are accumulated in the tracking register 92, which is initially zeroed by manual zero reset 132 and subsequently adjusted for desired offset adjustments between objects 12 and 14 by the hand controller 96 which enters digital numbers into the tracking register 92 corresponding to the desired offset. The relative displacements between objects 12 and 14 are read out of register 92 by digital to analog converter 94, which converts the digital number to an analog signal suitable for closed-loop control for automatic registration of objects 12 and 14.

Typical parameters are a reticle period of 0.01024 inches, a clock frequency of 1.024 MHz, a measurement rate of 1.000 K Hz which provides a spatial resolution referred to the reticle plane of 0.00001000 inches with 10 bit doppler comparators 110 and 120.

Ideally, the target images are coincident in the image plane by use of off-axis optics. Alternately, they are as close to each other as possible to minimize offset errors due to non-uniformities of the reticle ruling periodicity.

The use of reticles provides a high degree of immunity to motions along the reticle bars, only motions normal to the reticle bars are sensed. Thus the registration described above is said to have a sensing axis which is normal to the reticle bars, which ideally are parallel for both targets.

Two-axis and three-axis sensing for "X," "Y" and "$\theta$" can be performed with two and three sensors. Appropriate arrangements of these sensors eliminates cross-coupling between the sensing axis. A practical simiplification is the use of a single reference reticle with frequency-phase lock control and relay optics to bring the remote object images to a single image plane. For example, each quadrant of the reticle is allocated to each sensing axis.

Since certain changes may be made in the foregoing description without departing from the scope of the invention herein involved, it is intended that all matter contained in the above description and depicted in the accompanying drawings be construed in an illustrative sense and not in a limiting sense. Further, it is intended that sensing applications which require multi-axis precise angular position and/or rate sensing for example range finding and range-rate sensing and three dimensional linear velocity and displacement sensing, are within the scope of the invention herein involved.

What is claimed is:

1. A system for determining the relative displacement between two objects, said system comprising:
   a. sensor means for imaging a field of view of one object and a field of view of another object at a focal surface and for generating optical image signals related to the relative displacement of said fields of view at said focal surface, said optical image signals being periodic electrical signals having zero crossings; and
   b. sensor electronic means operatively connected to said sensor means for generating alignment signals related to said optical image signals and the relative displacement of the objects, said sensor electronic means including threshold decision logic means having an established threshold level, said optical image signals applied to said threshold decision logic means, said sensor electronic means generating said alignment signals when said established threshold level is exceeded before each zero crossing of said optical image signals.

2. The system as claimed in claim 1 wherein said sensor electronic means includes doppler comparator means and tracking register means, said doppler comparator means operatively connected to said threshold decision logic means, said tracking register means operatively connected to said doppler comparator means, said doppler comparator means generating a difference signal related to the displacement of the representations of said fields of view said difference signal being applied to said tracking register means when said threshold is exceeded before each zero crossing of said optical image signals.

3. The system as claimed in claim 2 wherein said sensor means includes rotating reticle means communicating with an optical path along which light flux of said fields of view propogate, said rotating reticle means operating as a relative spatial reference.

4. The system as claimed in claim 3 including clock means operatively connected to said rotating reticle means, said clock means generating clock pulses for synchronizing said rotating reticle means and said sensor electronic means.

5. The system as claimed in claim 2 wherein said sensor electronic means includes:
   a. threshold crossing analog to digital converter means operatively connected between said sensor means and said threshold decision logic means for processing said optical image signals, said threshold crossing analog to digital converter means providing a digital AM threshold FM cross-correlation optimum estimation process which eliminates dropouts due to image fluctuations; and
   b. zero crossing analog to digital converter means operatively connected between said sensor means and said threshold decision logic means for processing said optical image signals, said zero crossing analog to digital converter means optimizing correlation measurements at optical image signals zero crossing times.

6. The system as claimed in claim 5 wherein said sensor electronic means includes:
   a. clock means for generating synchronization pulses;
   b. reference counter means operatively connected to said clock means; and
   c. register digital to analog converter means operatively connected to said tracking register means;
   d. said tracking register means read out through said register digital to analog converter means;
   e. said register digital to analog converter means generating position signals defining relative displacements of the representation of said field of views.

7. The system as claimed in claim 6 wherein said sensor means includes reticle means and means for rotating said reticle means; and said sensor electronic means includes phase lock servo means for controlling said means for rotating, said reference counter means generating a reference signal which is applied to said phase-lock servo means.

8. A system for aligning a pair of objects, each said object having reticle bars, said system comprising:
   a. movable platform means on which at least one of the objects is mounted;
   b. sensor means including rotating reticle means communicating with an optical path along which light flux of images of the reticle bars propogates, said rotating reticle means imaging fields of view of the reticle bars of the objects at a focal surface and for generating an optical image signal functionally related to the displacement of said fields of view in said focal surface, said optical image signal being a periodic electrical signal which is characterized by zero crossings; and
   c. sensor electronic means operatively connected to said sensor means and said movable platform means, said sensor electronic means generating alignment signals related to said optical image signal, said sensor electronic means including threshold decision logic means having an established threshold level, said alignment signals generated by said sensor electronic means when said threshold level is exceeded before each zero crossing of said optical image signal, said alignment signals related to the relative displacement between the objects.

9. The system as claimed in claim 8 wherein said sensor electronic means includes doppler comparator means and tracking register means, said doppler comparator means operatively connected to said threshold decision logic means, said tracking register means operatively connected to said doppler comparator means, said doppler comparator means generating a difference signal related to the relative displacement of the reticles, said difference signal applied to said tracking register when said threshold is exceeded before each zero crossing of said optical image signal.

10. The system as claimed in claim 9 including clock means operatively connected to said rotating reticle means, said clock means generating clock pulses for synchronizing said rotating reticle means and said sensor electronic means.

11. The system as claimed in claim 8 wherein said sensor electronic means includes:
   a. threshold crossing analog to digital converter means operatively connected between said sensor means and said threshold decision logic means for processing said optical image signal, said threshold crossing analog to digital converter means providing a digital AM threshold FM cross-correlation optimum estimation process which eliminates dropouts due to image fluctuations; and
   b. zero crossing analog to digital converter means operatively connected between said sensor means and said threshold decision logic means for processing said optical image signal, said zero crossing analog to digital converter means optimizing correlation measurements at optical image signal zero crossing times.

12. The system as claimed in claim 11 wherein said sensor electronic means includes:
   a. clock means for generating synchronization pulses;
   b. reference counter means operatively connected to said clock means; and
   c. register digital to analog converter means operatively connected to said tracking register means;
   d. said tracking register means read out through said register digital to analog converter means;
   e. said register digital to analog converter means generating position signals defining displacements of the representation of said fields of view.

13. The system as claimed in claim 12 wherein said sensor means includes drive means for rotating said reticle means and said sensor electronic means includes phase lock servo means for controlling said drive means, said reference counter means generating a reference signal which is applied to said phase-lock servo means.

* * * * *